United States Patent [19]

Hashizume et al.

[11] Patent Number: 5,766,445
[45] Date of Patent: Jun. 16, 1998

[54] METHOD FOR PRODUCING A NITROGEN-ATOM CONTAINING CARBONACEOUS MATERIAL

[75] Inventors: Kenichi Hashizume, Kitagunma-gun; Miho Tsutsui, Numazu; Tomohiko Kaneko, Numazu; Sugio Otani, Kiryu, all of Japan

[73] Assignees: Research Development Corporation of Japan; Japan Carlit Co., Ltd., both of Japan

[21] Appl. No.: 568,230

[22] Filed: Dec. 6, 1995

[30] Foreign Application Priority Data

Dec. 6, 1994 [JP] Japan ................................. 6-302515

[51] Int. Cl.$^6$ ..................... C25B 3/00; C25B 3/10; H01M 4/60
[52] U.S. Cl. ................ 205/414; 205/419; 205/424; 205/426; 205/431; 429/212; 429/213; 429/218
[58] Field of Search .................... 205/414, 419, 205/424, 426, 431; 429/212, 213, 218

[56] References Cited

U.S. PATENT DOCUMENTS

| | | | |
|---|---|---|---|
| 4,401,545 | 8/1983 | Naarmann et al. | 205/419 |
| 4,702,977 | 10/1987 | Hiratsuka et al. | 429/218 |
| 5,342,710 | 8/1994 | Koksbang | 429/218 |
| 5,348,818 | 9/1994 | Asami et al. | 429/213 |
| 5,489,492 | 2/1996 | Asami et al. | 429/212 |

OTHER PUBLICATIONS

J. Bargon et al., *IBM J. Res. Develop.*, 27(4), 330–341 (Jul. 1983).

M.R. Wixom, *J. Am. Ceram. Soc.*, 73(7), 1973–1974 (1990). No month available.

Hansen et al., "Properties and Modeling of Carbon Fibers and Their Intercalation Compounds", Synthetic metals, 3, pp. 150–158, 1981.

Isaacs, The Graphitization of Organic Compounds–III. Heterocyclic Nitrogen Derivatives of Anthracene and Phenanthrene, Carbon, vol. 8, pp. 1–5, 1970.

*Primary Examiner*—Kathryn L. Gorgos
*Assistant Examiner*—Edna Wong
*Attorney, Agent, or Firm*—Wenderoth, Lind & Ponack

[57] ABSTRACT

The present invention provides a method for forming a novel carbonaceous material, which has properties such as acceptor properly useful as a secondary cell electrode material and a host material for catalyst, comprising of the steps of electrochemically polymerizing a nitrogen-containing organic compound as a monomer constituent, and heat-treating the resultant polymer as a carbon precursor.

3 Claims, 5 Drawing Sheets

Pyrrole → Polypyrrole

Crosslinked polypyrrole

Pyrrole → Polypyrrole

Crosslinked polypyrrole

F I G. 4
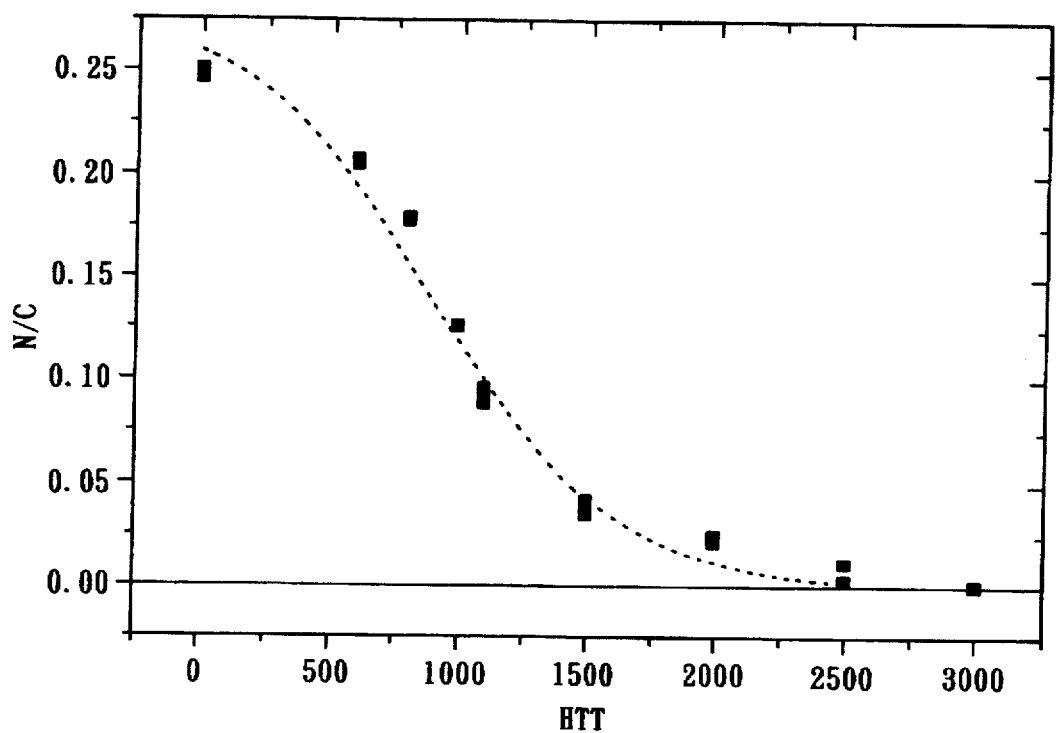

F I G. 5
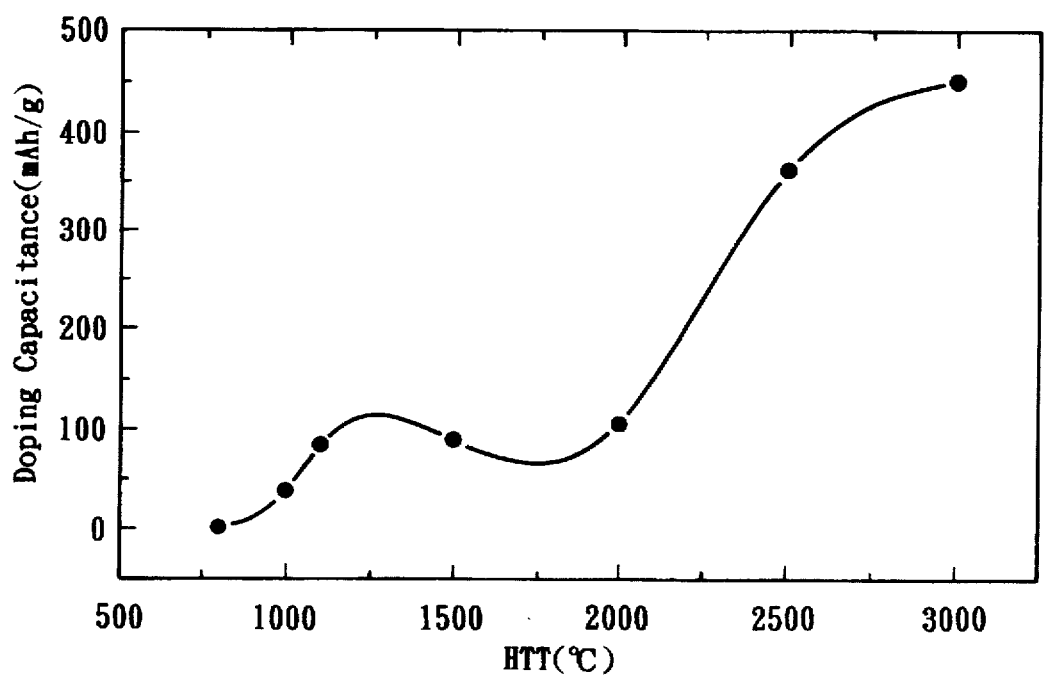

METHOD FOR PRODUCING A NITROGEN-ATOM CONTAINING CARBONACEOUS MATERIAL

FIELD OF THE INVENTION

The present invention relates to a method for producing a nitrogen-atom-containing carbonaceous material. More particularly, the present invention relates to a method for producing a novel nitrogen-atom-containing carbonaceous material useful as an electrode material for a secondary cell, a host material such as a catalyst, or as an adsorbent.

PRIOR ART AND PROBLEMS

There is conventionally known a method for producing a carbonaceous material by thermally decomposing an organic substance, and further heat-treating same to carbonize. Improvement of properties of such material through deployment of the graphite structure is studied from various points of view.

Because carbonaceous materials have basic properties including a light weight, heat resistance, conductivity, a high thermal conductivity and a low thermal expansion coefficient, these materials have been used in a wide range of applications, and development efforts of new materials are being made to respond to requests from many areas.

Recently, in particular, general attention is attracted by various attempts to further develop these features of carbonaceous materials by combining them with other substances and other materials. One of such attempts is the effort to convert a carbonaceous material into a new compound. This effort of conversion into a compound is to further expand the ranges of properties of carbonaceous materials through doping of other substances and furthermore adding other materials.

These carbonaceous materials are now noted for applications as conductive materials rich in advantages, as new reaction catalysts and adsorbents based on intercalation of molecules and ions, and further as electrode materials for secondary cells.

In the prior art, however, almost no attempt is known that incorporates other atoms even into the basic skeletal structure to form a carbonaceous material so that attempts of converting into a compound have had inevitable limitations in this respect. There has therefore been a demand for development of a method for achieving new functional properties based on conversion of a carbonaceous material into a compound, as a method other than doping and expanded intercalation.

SUMMARY OF THE INVENTION

The present invention was developed in view of the circumstances as described above, and has an object to provide a method for permitting production of a carbonaceous material containing nitrogen atoms as a method which enables new development of carbon materials.

As means to solve the above-mentioned problems, the present invention provides a method for producing a nitrogen-atom-containing carbonaceous material, which comprises the steps of electro-chemically polymerizing a nitrogen-containing organic compound as a monomer constituent, and heat-treating the resultant polymer as a carbon precursor.

Embodiments of the present invention include, in the producing method as described above, one wherein the nitrogen-containing organic compound is a nitrogen-containing heterocyclic compound, wherein the nitrogen-containing compound is pyrrole, and wherein the heat-treatment is carried out at a temperature within a range of from 600° to 3,200° C., and a metal ion occluding nitrogen-atom-containing carbonaceous material.

BRIEF DESCRIPTION OF THE DRAWINGS

FIG. 4 shows a relational diagram showing changes in the ratio of nitrogen atoms and carbon atoms contained in the carbonaceous material under the effect of changes in the heat treatment temperature in an embodiment; and FIG. 5 shows a graph illustrating the lithium ion occluding ability in an embodiment.

DETAILED DESCRIPTION OF THE INVENTION

Figure 1:
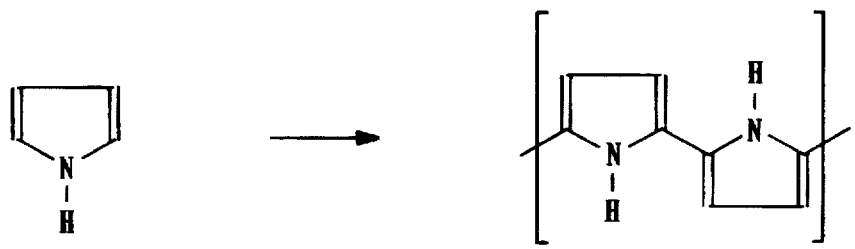
FIG. 1 shows a reaction process diagram illustrating the production process of pyrrole polymer.
Figure 1:
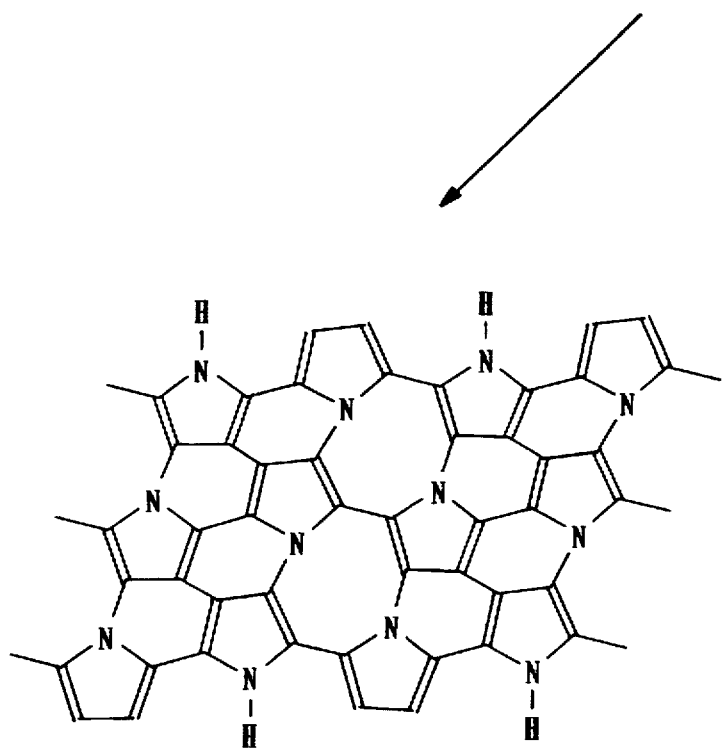

The present invention provides a new carbonaceous material through conversion of nitrogen atoms into a compound by using a nitrogen-containing organic compound, and adopting the steps of electrolytically polymerizing this compound, and then heat-treating same, thereby permitting achievement of new properties and new applications. In this case, applicable nitrogen-containing organic compounds include aliphatic, alicyclic, aromatic, and as heterocyclic compounds, those having nitrogen atoms or a function group thereof. Among others, heterocyclic compounds having nitrogen atoms as ring forming atoms are particularly useful. For example, any of such nitrogen-containing cyclic organic compounds as pyrrole, imidazole, pyridine, piperidine, triazole, and tetrazole may appropriately be used. FIG. 1 illustrates, for example, the polymer production process and the production process of a crosslinking structure caused by the subsequent heat treatment: electrolytic polymerization causes progress of the production reaction of such a polymer, and the heat treatment of the resultant polymer gives a polymer having a higher degree of cross-linking as shown in FIG. 1. This cross-linking is further accelerated by the heat treatment, thus promoting conversion into a carbonaceous material.

The electrolytic polymerization reaction can be conducted in a solution of a supporting electrolyte such as a quarternary ammonium salt, an onium salt, or a phosphonium salt. A typical supporting electrolyte is, for example, tetraethyl ammonium tetrafluoroborate as a tetraalkylammonium salt, used in the form of a solution thereof with an appropriate solvent. Applicable solvents include acetonitrile, DMF, DMSO, DMAA, THF, pyridine, water and alcohol.

A polymer is produced by this electrolytic polymerization.

Then, in the present invention, the resultant polymer of the nitrogen-containing cyclic organic compound is heat-treated.

In this heat treatment, the polymer is heat-treated by heating to a high temperature within a range of from 600° to 2,500° C. usually in an inert gas such as $N_2$, Ar or He, or in vacuum. The heating rate in heating should preferably be within a range of from about 5° to 50° C./minute. Another embodiment comprises a heat treatment at a temperature within a range of from 2,500° to 3,200° C.

The temperature for the heat treatment may be determined by taking account of properties and structure of the polymer as a precursor, and required properties of the product carbonaceous material.

The resultant nitrogen-containing material of the present invention is useful as a material for a secondary cell electrode, as a metal ion occluding adsorbent and a host material for catalyst.

Now, the present invention is described in further detail by means of examples. It is needless to mention that the present invention is not limited by the examples described below.

EXAMPLES

An acetonitrile solution containing 10 mM pyrrole and 0.1M tetraethylammonium tetrafluoroborate was used as an electrolyte. A platinum sheet (10 wide×50 long×0.1 mm thick) was immersed by 4 cm into the electrolyte. Electrolytic polymerization was carried out at a current density of 8 mA for 90 minutes and pyrrole polymer was obtained. This polymer was heat-treated to obtain a carbonaceous material.

Figure 2:
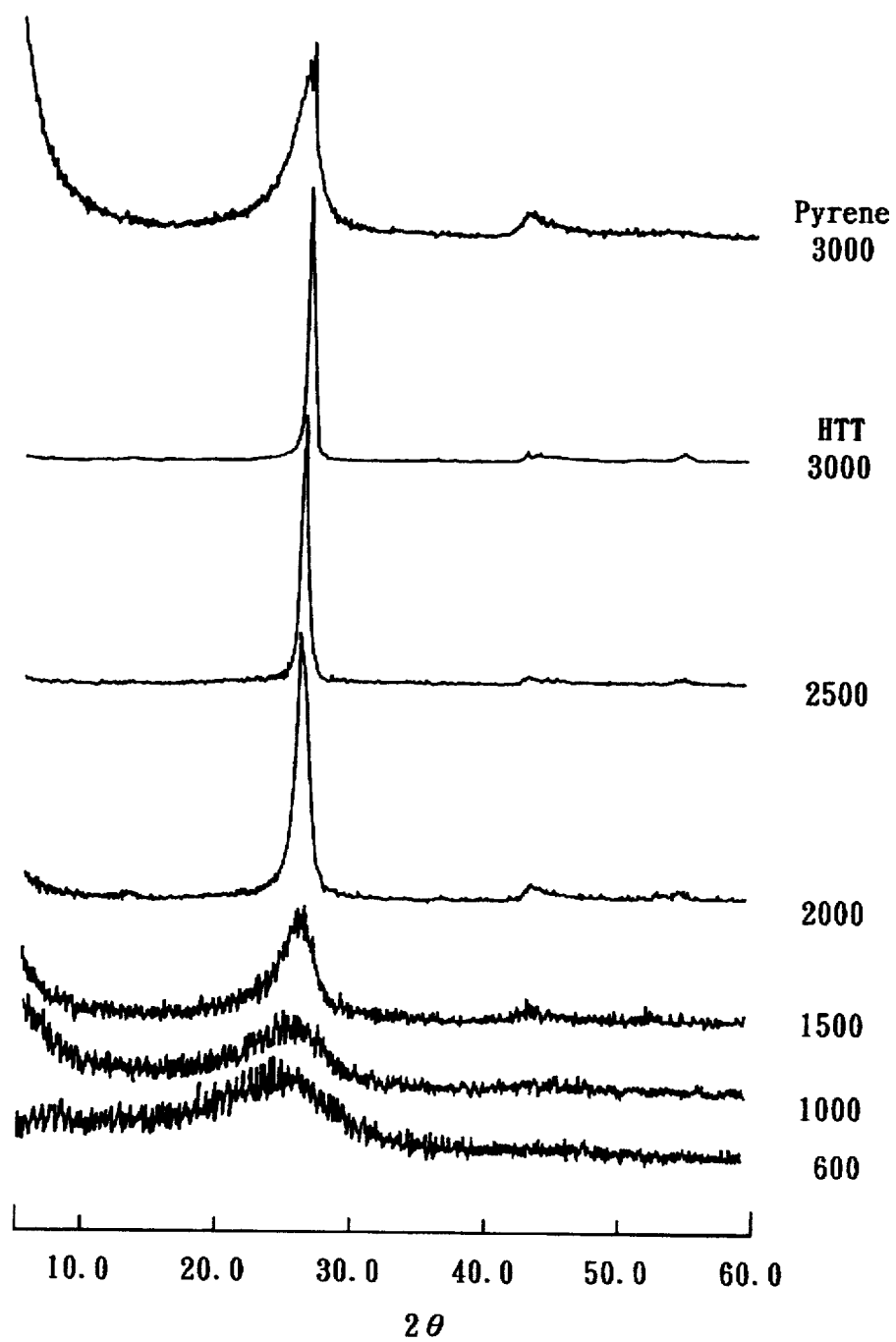
FIG. 2 shows an X-ray powder diffraction spectral diagram of an embodiment.

FIG. 2 illustrates X-ray powder diffraction spectra for carbonaceous materials produced at various heat treatment temperatures in comparison with that of pyrene (3,000° C.). FIG. 2 suggests that a peak corresponding to carbon d002 clearly appears in the heat treatment at a temperature over 600° C., particularly over 2,000° C.

Figure 3:
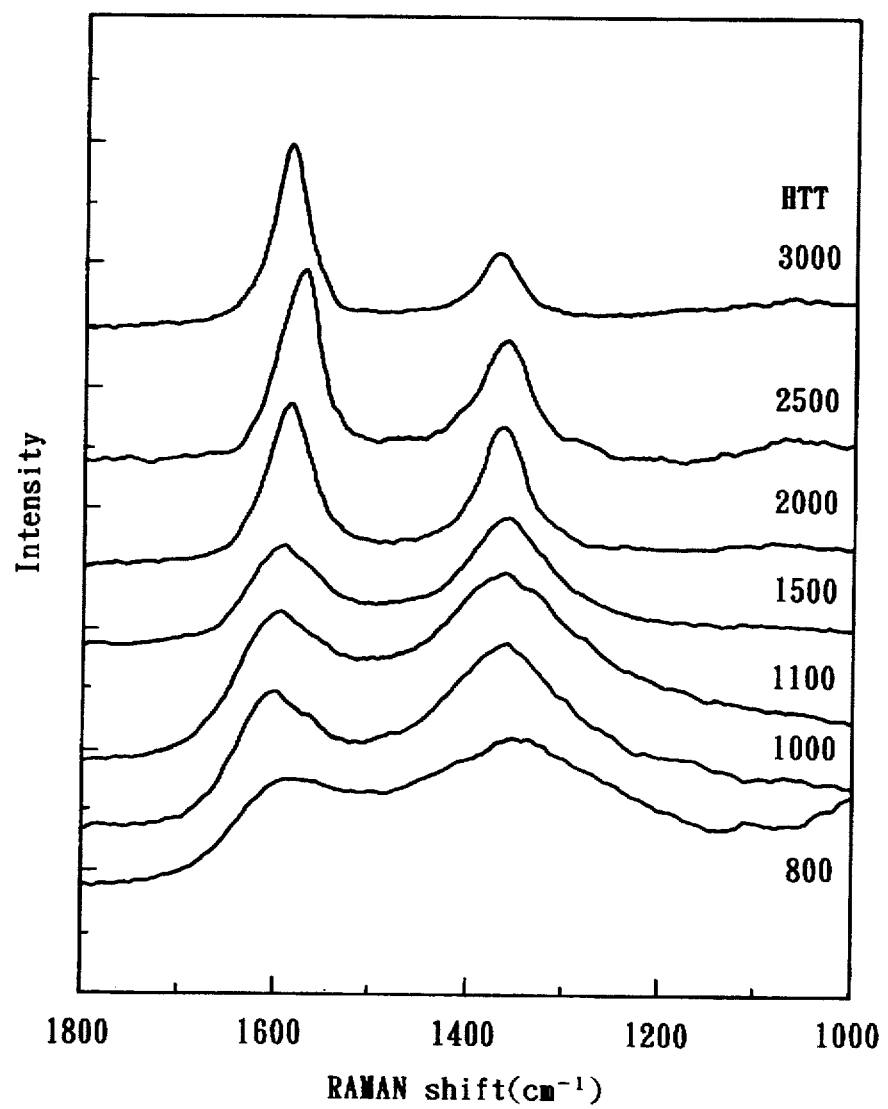
FIG. 3 shows an Raman spectral diagram of an embodiment.

FIG. 3 illustrates Raman spectra. Along with the increase in the heating temperature, two peaks of 1,350 $cm^{-1}$ and 1,580 $cm^{-1}$ clearly appear for carbon. Production of a carbonaceous material is thus confirmed.

FIG. 4 illustrates the correlation between the heat treatment temperature and the N/C (atomic) ratio of the produced carbonaceous material.

FIG. 5 illustrates the heat treatment temperature and lithium ion occluding ability of the produced carbonaceous material. It is suggested that the occluding ability largely of the produced carbonaceous material increases by a heating temperature of over 2,000° C., particularly over 2,500° C.

According to the present invention, as described above in detail, there is provided a novel carbonaceous material having excellent properties including a high acceptor property useful as a secondary electrode material and a host material for catalyst.

What is claimed is:

1. A method for producing a nitrogen-atom-containing carbonaceous material, which comprises the steps of electrochemically polymerizing a pyrrole as a monomeric constituent and heat-treating the resultant polymer at 600° to 3200° C. to produce said carbonaceous material.

2. The method for producing a nitrogen-atom-containing carbonaceous material as claimed in claim 1, wherein said heat treatment is carried out at a temperature within a range of from 2,500° to 3,200° C.

3. The method for producing a nitrogen-atom-containing carbonaceous material as claimed in claim 1, wherein the carbonaceous material is a metal ion occluding nitrogen-atom-containing carbonaceous material.

* * * * *